(12) United States Patent
Perlman et al.

(10) Patent No.: US 8,114,461 B2
(45) Date of Patent: Feb. 14, 2012

(54) BALANCED SN-2 MYRISTATE-CONTAINING EDIBLE OIL

(75) Inventors: Daniel Perlman, Arlington, MA (US); Kenneth C. Hayes, Wellesley, MA (US)

(73) Assignee: Brandeis University, Waltham, MA (US)

(*) Notice: Subject to any disclaimer, the term of this patent is extended or adjusted under 35 U.S.C. 154(b) by 0 days.

(21) Appl. No.: 12/197,542

(22) Filed: Aug. 25, 2008

(65) Prior Publication Data

US 2011/0104326 A1 May 5, 2011

(51) Int. Cl.
*A23D 9/00* (2006.01)
*A23D 9/02* (2006.01)

(52) U.S. Cl. .......................... 426/601; 426/33

(58) Field of Classification Search ............... 426/601, 426/613, 33
See application file for complete search history.

(56) References Cited

U.S. PATENT DOCUMENTS

| | | | | |
|---|---|---|---|---|
| 4,275,011 | A | * | 6/1981 | Tanaka et al. ............... 435/134 |
| 5,578,334 | A | | 11/1996 | Sundram et al. |
| 5,843,497 | A | | 12/1998 | Sundram et al. |
| 6,630,192 | B2 | | 10/2003 | Sundram et al. |
| 7,229,653 | B2 | | 6/2007 | Sundram et al. |
| 2006/0241080 | A1 | | 10/2006 | Dror et al. |
| 2008/0096816 | A1 | | 4/2008 | Fogelman et al. |

OTHER PUBLICATIONS

Dabadie, H. 2006. British Journal of Nutrition 96:283-289.*
Dabadie, H. 2005. Journal of Nutritional Biochemistry 16:375-382.*
Dabadie, H. et al. "Moderate intake of myristic acid in sn-2 position has beneficial lipidic effects and enhances DHA of cholesteryl esters in an interventional study," *J Nutri Biochem* (2005); 16(6): 375-382.
Dabadie, H. et al. "Variations in daily intakes of myristic and α-linolenic acids in sn-2 position modify lipid profile and red blood cell membrane fluidity," *Br J Nutr* (2006); 96(2):283-289.
Khosla, et al., "Dietary fat saturation in rhesus monkeys affects LDL concentrations by modulating the independent production of LDL apolipoprotein B," *Biochem Biophys Acta* (1991); 1083: 46-50.
Karupaiah et al., "Effects of sterospecific positioning of fatty acids in triacylglycerol structures in native and randomized fats: a review of their nutritional implications," *Nutrition and Metabolism* (2007); 4:16.
Loison et al., "Dietary myristic acid modifies the HDL-cholesterol concentration and liver scavenger receptor BI expression in the hamster," *Br J Nutr* (2002); 87: 199-210.
McGandy et al., "Use of semisynthetic fats in determining effects of specific dietary fatty acids on serum lipids in man," *Am J Clin Nutr* (1970); 23(1): 1288-1298.
Mensink "Effects of the individual saturated fatty acids on serum lipids and lipoprotein concentrations," *Am J Clin Nutr* (1993); 57 (suppl): 711S-714S.
Mukherjee et al., "The influence of myristic acid of dietary fats on serum cholesterol," *J Atheroscler Res* (1969); 10(1): 51-54.
Nelson et al., "Plasma lipoprotein fatty acids are altered by the positional distribution of fatty acids in infant formula triacylglycerols and human milk," *Am J Clin Nutr* (1999); 70:62-69.
Pronczuk, A. et al., "Dietary myristic, palmitic, and linoleic acids modulate cholesterolemia in gerbils," *FASEB J.* (1994); 8:1191-1200.
Sanders et al. "Influence of triacylglycerol structure on the postprandial response of factor VII to stearic acid-rich fats," *Am J Clin Nutr* (2003); 77:777-782.
Snook et al., "Effect of synthetic triglycerides of myristic, palmitic, and stearic acid on serum lipoprotein metabolism," *Eur J Clin Nutr* (1999); 53: 597-605.
Sundram, K. et al., "Stearic acid-rich interesterified fat and trans-rich fat raise the LDL/HDL ratio and plasma glucose relative to palm olein in humans," *Nutr Metab* (2007); 4:3.

* cited by examiner

*Primary Examiner* — Carolyn Paden
(74) *Attorney, Agent, or Firm* — Wolf, Greenfield & Sacks, P.C.

(57) ABSTRACT

A nutritional fat or oil-based composition for increasing HDL cholesterol, decreasing LDL cholesterol and decreasing the LDL/HDL cholesterol ratio in human plasma is described. The composition typically includes at least 1% by weight myristic acid esterified at the sn-2 position in triglyceride molecules, includes between 10% and 40% by weight linoleic acid, and further includes between 30% and 65% by weight oleic acid and between 15% and 40% by weight total saturated fatty acids. The ratio of sn-2 myristic acid to sn-2 palmitic acid is typically greater than 1:1 and the sum of weight percentages for saturated, monounsaturated and polyunsaturated fatty acids equals 100%. In desirable cases, the composition is substantially cholesterol-free.

15 Claims, No Drawings

BALANCED SN-2 MYRISTATE-CONTAINING EDIBLE OIL

RELATED APPLICATIONS

NOT APPLICABLE.

FIELD OF THE INVENTION

The present invention relates to compositions and methods for increasing the level of HDL cholesterol, reducing LDL cholesterol and the ratio of LDL to HDL in human plasma by supplementing or replacing conventional dietary fats with a particular class of dietary fats.

BACKGROUND OF THE INVENTION

The following discussion is provided solely to assist the understanding of the reader, and does not constitute an admission that any of the information discussed or references cited constitute prior art to the present invention.

Over the past 40 years clinical research has been reported studying dietary fats and their role in modulating major species of plasma lipoproteins. A number of review articles have been written on the subject of coronary heart disease, controlling plasma cholesterol levels (e.g., Steinberg et al. 1999; JAMA, 282(21): 2043-2050), and specifically on the role of dietary fats in altering plasma lipoprotein levels (e.g., Mensink et al. 2003; Am J Clin Nutr, 77:1146-1155). Other research has studied changes in lipoprotein levels resulting from dietary fats that are rich in various fatty acids. For example, Tholstrup et al. (1994; Am J Clin Nutr, 59:371-377) studied changes in lipoprotein levels resulting from diets rich in different saturated fatty acids including stearic acid (provided by shea butter), palmitic acid (palm oil) and lauric and myristic acids (provided by palm kernel oil).

For over thirty years researchers have studied and compared different fatty acids for their abilities to raise or lower overall cholesterol levels in human plasma. While there are divergent opinions on many aspects of this subject, most nutritional experts agree that the saturated class of fatty acids (herein abbreviated SFA) raises total cholesterol levels (herein abbreviated TC levels), while polyunsaturated fatty acids (herein abbreviated PUFA) lower them, and monounsaturated fatty acids (MUFA), e.g., oleic acid, are more neutral in their effect.

As a point of clarification and to avoid confusion, fats that contain mostly SFA are termed saturated fats (or SATS) while those fats containing mostly MUFA are termed monounsaturated fats (or MONOS), and those fats containing mostly PUFA are termed polyunsaturated fats (or POLYS). Beyond this simplistic view, it also understood that metabolism of individual fatty acid species within each class, can impact HDL and LDL cholesterol levels to different degrees.

A number of research studies have used regression analysis to suggest that of the more common SFAs including lauric acid (C12:0), myristic acid (C14:0), palmitic acid (C16:0) and stearic acid (C18:0) found in many edible fats and oils, myristic acid with 14 carbon atoms and zero sites of carbon-carbon unsaturation (C14:0) appears to be most potent in elevating total cholesterol (TC) levels in the plasma. Consistent with these findings, some manufacturers of processed foods avoid the use of hardening fats such as coconut oil or palm kernel oil that contain high levels of myristic acid, in favor of palm stearin and regular palm oil that are also hardening fats, but contain high levels of palmitic and stearic acids instead.

Thus, a recently produced commercial margarine known as Smart Balance® buttery spread (GFA Brands, Inc., Cresskill, N.J.) that combines the beneficial LDL cholesterol-lowering properties of PUFA, e.g., found in soybean oil, with the beneficial oil hardening property and HDL cholesterol-raising property of SFA, incorporates palm oil rather than palm kernel oil to achieve the requisite hardened texture. This margarine and related healthful fat blends are based upon the work of Sundram et al., described in U.S. Pat. No. 5,578,334, No. 5,843,497, Nos. 6,630,192 and 7,229,653 incorporated herein in their entireties. Sundram et al. describe a cholesterol-free blended fat composition that combines a polyunsaturated fat (with linoleic acid providing between 15% and 40% by weight of the composition), and a cholesterol-free saturated fat (with one or more SFA from the group including lauric, myristic, and palmitic providing between 20% and 40% by weight of the composition). The effect of the saturated fat, i.e., palm oil, in this margarine is to increase both HDL and LDL cholesterol while the effect of the polyunsaturated vegetable oil is to lower LDL cholesterol. The net effect of regularly consuming such a fat blend composition instead of a typical American dietary fat was shown to be a modest increase in the HDL concentration and an increase in the HDL/LDL concentration ratio in the blood.

With regard to the selection of palm oil as a saturated fat, in U.S. Pat. No. 5,578,334 it has been shown by Khosla and Hayes (Biochem. Biophys. Acta; 1991, 1083: 46-50) that the combination of lauric and myristic acids found in palm kernel oil or coconut oil can produce a larger LDL pool and a poorer (lower) HDL/LDL ratio than palmitic and oleic acids. Similarly, Mensink (Am J Clin Nutr, 1993; 57 (suppl.) 711 S-714S) points out that myristic acid is more hypercholesterolemic than palmitic acid. These and other studies have led to the conclusion that dietary 12:0 and 14:0 fatty acids are worse than 16:0 and 18:0 in terms of raising LDL, and it has been reassuring that palm oil rather than palm kernel oil is usually used as hardstock in margarines and in baking and frying shortenings. Consistent with these findings, Sundram et al. in the above-cited series of U.S. patents indicate that palmitic acid (rather than lauric or myristic acid) is the preferred saturated fatty acid to be included in the fat composition (see, for example, claims 11 and 12 in U.S. Pat. No. 7,229,653).

As briefly discussed above, there is a body of research in which SFAs of differing chain length have been studied for their abilities to increase HDL and LDL plasma cholesterol levels. More recently, some research has been reported concerning the positional effect of fatty acids within the triglyceride molecule. That is, the ability of a fatty acid to alter plasma cholesterol levels may depend upon which of the three glyceryl-ester positions, i.e., the sn-1 and sn-3 (end positions), or the sn-2 (middle position) it occupies. This positional effect can be due to the difference in enzymatic cleavage and preferential degradation versus absorption of the fatty acid. For example, the pancreatic lipase enzymes that cleave individual fatty acids from the glycerol backbone of the fat molecule selectively hydrolyze and remove the fatty acids at the sn-1 and sn-3 positions while leaving the sn-2 fatty acid attached to the glycerol backbone to generate a sn-2 monoglyceride. The latter can be absorbed into the intestinal cells and reformed as a triglyceride or phospholipids for transport in the bloodstream. Some of these molecules can reach the liver where they may affect cholesterol and triglyceride metabolism in varied and complex ways. It is well known that free fatty acids liberated from TG by the action of various lipases in the gut, peripheral blood vessels, or adipose tissue can be catabolized to provide energy for the body, or may be used in the re-synthesis of triglycerides.

For the benefit of the reader, the following is a brief summary describing fat digestion, transport and oxidation. Fatty acids are principally ingested as triglycerides, i.e., fats and oils, which cannot be immediately absorbed by the intestine. Fats are broken down into free fatty acids plus monoglycerides by the pancreatic lipase enzyme that complexes with a protein called colipase which is necessary for its activity. The complex can only function at a water-fat interface. For enzymatic fat digestion to be efficient, it is essential that fatty acids and fats be emulsified by bile salts from the gall bladder. Fats are absorbed as free fatty acids and 2-monoglycerides, but a small fraction is absorbed as free glycerol and as diglycerides. Once across the intestinal barrier, fatty acids can be reformed into triglycerides or phospholipids and packaged into chylomicrons or liposomes, which are released into the lymphatic system and then into the blood. Fats are either stored or oxidized for energy, and the liver acts as the major organ for fatty acid metabolism and the processing of chylomicron remnants and liposomes into the various lipoproteins including VLDL and LDL. Fatty acids synthesized in the liver are converted to triglycerides and transported to the blood as VLDL. In peripheral tissues, lipoprotein lipase converts part of the VLDL into LDL and free fatty acids, which are taken up for metabolism. LDL is taken up via LDL receptors by liver and other tissues. This provides a mechanism for uptake of LDL by the cell, and for its breakdown into free fatty acids, cholesterol, and other components of LDL.

When blood sugar is low, the hormone, glucagon, signals adipocytes to activate hormone-sensitive lipase to convert triglycerides into free fatty acids. While the fatty acids have very low solubility in the blood (typically about 1 μM), the most abundant protein in blood, serum albumin, binds free fatty acids, increasing their effective solubility to ~1 mM, allowing fatty acid transport to organs such as muscle and liver for oxidation when blood sugar is low. Fatty acid catabolism or breakdown that results in the release of energy involves three major steps including activation and transport into the mitochondria, beta oxidation, and electron transport. More specifically, fatty acids enter the mitochondria primarily through carnitine-palmitoyl transferase I (CPT-I). It is believed that activity of this enzyme is the rate limiting step in fatty acid oxidation. Once inside the mitochondrial matrix, fatty acids undergo beta-oxidation. During this process, two carbon molecules (acetyl-CoA) are repeatedly cleaved from the fatty acid. The acetyl-CoA can then enter the Krebs Cycle, producing high energy NADH and FADH, that are subsequently used in the electron transport chain to produce high energy ATP for cellular processes.

SUMMARY OF THE INVENTION

The present invention concerns fat compositions and related methods for increasing HDL and/or reducing the LDL:HDL ratio in human serum. This is accomplished by creating and using a fat composition which includes an appropriate balance of sn-2 myristate without excessive sn-2 palmitate, and with appropriate levels of linoleic acid, oleic acid, and total saturated fatty acids.

Thus, a first aspect of the invention concerns an edible fat composition which includes at least 1% and preferably at least 2 or 3% by weight myristic acid esterified at the sn-2 position in triglyceride molecules, between 10% and 40% by weight linoleic acid, between 30% and 65% by weight oleic acid, and between 15% and 40% by weight saturated fatty acids in toto, where the weight ratio of sn-2 myristic acid to sn-2 palmitic acid is at least 1:1 and the sum of weight percentages for saturated, monounsaturated and polyunsaturated fatty acids equals 100%. In certain cases, the specified level of linoleic acid is replaced with a combination of at least 2, 3, or 4 polyunsaturated fatty acids taken in any combination selected from the group consisting of linoleic acid, alpha-linolenic acid, eicosapentaenoic acid (EPA), and docosahexaenoic acid (DHA). Preferably the fat composition is substantially cholesterol-free.

In particular embodiments, consistent ingestion of the edible fat composition (e.g., as part of a daily diet) increases HDL cholesterol, decreases LDL cholesterol and/or decreases the LDL/HDL cholesterol ratio in human plasma.

For some embodiments, the weight ratio of sn-2 myristic acid to sn-2 palmitic acid is at least 1:1, 1.1:1, 1.2:1, 1.3:, 1.4:1, 1.5:1, 1.7:1, 2:1, 2.2:1, or 2.5:1 or is in a range defined by taking any two of the just-specified ratio values as endpoints of the range; the weight ratio of sn-2 myristic acid to sn-2 lauric acid is at least 0.8:1, 0.9:1, 1:1, 1.1:1, 1.2:1, 1.3:, 1.4:1, 1.5:1, 1.7:1, 2:1, 2.2:1, or 2.5:1 or is in a range defined by taking any two of the just-specified ratio values as endpoints of the range; the weight ratio of sn-2 myristic acid to (sn-2 palmitic acid plus sn-2 lauric acid) is at least 0.3:1, 0.4:1, 0.5:1, 0.6:1, 0.7:1, 0.8:1, 0.8:1, 1:1, 1.2:1, 1.5:1, 1.7:1, or 2:1, or is in a range defined by taking any two of the just-specified ratio values as endpoints of the range.

In certain embodiments, at least 20, 30, 40, 50, 60, or 70% of the myristic acid esterified at the sn-2 position in triglyceride molecules is produced by chemical or enzymatic inter-esterification or both; the composition includes at least 4, 5, 6, 7, 8, 9, 10, 12, 15, 17, 20, or 25%, or in a range of 3 to 25%, 3 to 20%, 3 to 10%, 3 to 5%, 5 to 25%, 5 to 20%, 5 to 15%, 5 to 10%, 5 to 8%, 8 to 20%, 8 to 17%, 8 to 16%, 8 to 15%, 8 to 12%, 10, to 25%, 10 to 20%, or 10 to 15%, 12 to 20%, 12 to 17%, 12 to 16%, or 12 to 15% by weight myristic acid esterified at the sn-2 position in triglyceride molecules; no more than 2, 3, 4, 5, 6, 7, 8, 9, 10, or 12% by weight of the triglyceride molecules which include myristic acid have three myristic acid residues; at least 20, 30, 40, or 50% of the triglyceride molecules which include myristic acid have only two myristic acid residues; at least 20, 30, 40, or 50% of the triglyceride molecules which include myristic acid have only one myristic acid residue; the sn-2 myristic acid is esterified in glyceride molecules selected from the group consisting of triglycerides, diglycerides, monoglycerides and combinations thereof; at least 70, 80, 90, 95, or 97% of the sn-2 myristic acid is esterified within triglyceride molecules.

Also in certain embodiments, the ratio by weight of saturated fatty acids to linoleic acid in the edible fat composition is greater than 0.5, 0.6, 0.7 0.8, 0.9, 1.0, 1.1, 1.2, 1.5, 1.7, 2.0, 2.5, or 3.0, or is in a range of 0.5 to 3.0, 0.5 to 2.0, 0.5 to 1.0, 1.0 to 3.0, 1.0 to 2.0, or 2.0 to 3.0.

For some embodiments, at least 50, 60, 70, 80, or 90% of the triglyceride molecules having an sn-2 myristic acid carry unsaturated fatty acids esterified at either one or both of the sn-1 and sn-3 glyceride positions, e.g., selected from the group consisting of oleic acid, linoleic acid, alpha-linolenic acid, EPA, DHA and combinations thereof; at least 40, 50, 60, 70, 80, or 90% of the triglyceride molecules which include sn-2 myristic acid also include myristic acid esterified at either the sn-1 or sn-3 glyceride position or both, or at either the sn-1 or sn-3 position but not both.

The edible oils of the present invention can advantageously be used in preparation of any of a variety of different products. Thus, a related aspect of the invention concerns a prepared food product which includes the edible fat composition of the preceding aspect or an embodiment thereof.

In certain embodiments, the prepared food produce is a cooking oil, an oil spread (e.g., a margarine), a shortening, a salad dressing; a barbecue or dipping sauce or other condiment, a baked good (e.g., bread, tortilla, pastry, cake, cookie, or pie), or a dairy product (e.g., a milk, yoghurt, or cheese); in certain embodiments, the present edible fat composition is 2 to 10, 5 to 15, 10 to 30, 30 to 50, or 50 to 100% by weight of the prepared food product.

Another related aspect concerns a human diet or diet formulation which is intended for or has the effect of increasing the concentration of HDL cholesterol, decreasing the LDL cholesterol, and/or increasing the HDL/LDL concentration ratio in human plasma, in which a substantial amount, e.g., 10 to 100%, 10 to 90%, 10 to 80%, 10 and 75%, 10 to 50%, 20 to 100%, 20 to 80%, 20 to 60%, 30 to 100%, 30 to 80%, 50 to 100%, or 50 to 80% by weight of the daily dietary fat is provided by the edible fat composition of the first aspect or an embodiment thereof.

In particular embodiments, the human diet formulation is provided in liquid form or in packaged form, e.g., indicated for weight loss, for nutritional supplementation or replacement for elderly patients or patients with compromised digestive systems, or for improvement of a patient's lipoprotein profile.

Likewise, the invention provides a method of aiding a person to increase the concentration of HDL cholesterol, decrease the LDL cholesterol, and/or increase the HDL/LDL cholesterol ratio in their plasma. The method involves providing a structurally modified triglyceride-based dietary fat composition, where the dietary fat composition includes at least 1% and preferably at least 2 or 3% by weight myristic acid esterified at the sn-2 position in triglyceride molecules, between 10% and 40% by weight linoleic acid, between 30% and 65% by weight oleic acid, and between 15% and 40% by weight total saturated fatty acids, where the ratio of sn-2 myristic acid to sn-2 palmitic acid is greater than 1:1, and the sum of weight percentages for saturated, polyunsaturated and monounsaturated fatty acids equals 100%. Preferably the fat composition is substantially cholesterol-free In particular embodiments, the edible oil composition is as described for the first aspect above or an embodiment thereof; the edible oil composition is provided at least in part or primarily in one or more prepared foods or diets or diet formulations (e.g., liquid diet formulations) as specified for an aspect above or an embodiment thereof.

In certain embodiments, the person suffers from high LDL cholesterol and/or from low HDL/LDL cholesterol ratio in their plasma; the person is clinically obese.

Similarly, another related aspect concerns a method of increasing the concentration of HDL cholesterol, decreasing the LDL cholesterol, and/or increasing the HDL/LDL cholesterol ratio in the plasma of a human subject. The method involves consistently ingesting a structurally modified triglyceride-based dietary fat composition which includes at least 1% and preferably at least 2 or 3% by weight myristic acid esterified at the sn-2 position in triglyceride molecules, between 10% and 40% by weight linoleic acid, between 30% and 65% by weight oleic acid, and between 15% and 40% by weight total saturated fatty acids. The ratio of sn-2 myristic acid to sn-2 palmitic acid is greater than 1:1, and the sum of weight percentages for saturated, polyunsaturated and monounsaturated fatty acids equals 100%. Preferably the fat composition is substantially cholesterol-free.

In particular embodiments, the dietary fat composition is as specified as an edible oil composition for the first aspect above or an embodiment thereof.

A further aspect concerns a method of preparing an edible fat composition by blending an edible oil rich in sn-2 myristate with at least one other edible oil, thereby forming a blended edible oil which includes at least 1% and preferably at least 2 or 3% by weight myristic acid esterified at the sn-2 position in triglyceride molecules, between 10% and 40% by weight linoleic acid, between 30% and 65% by weight oleic acid, and between 15% and 40% by weight total saturated fatty acids. The ratio of sn-2 myristic acid to sn-2 palmitic acid is greater than 1:1, and the sum of weight percentages for saturated, polyunsaturated and monounsaturated fatty acids equals 100%. Preferable the edible oil rich in sn-2 myristate, the at least one other edible oil, and/or the edible fat composition are substantially cholesterol-free.

In certain embodiments, the edible oil rich in sn-2 myristate is formed by a method that includes enzymatic or chemical interesterification, generally resulting in an increase in the sn-2 myristate level; the edible fat composition is as specified for the edible oil of the first aspect above or an embodiment thereof.

Additional embodiments will be apparent from the Detailed Description and from the claims.

DETAILED DESCRIPTION OF THE PREFERRED EMBODIMENTS

A. Overview

The present invention focuses on subtle differences in the human body's lipoprotein regulatory response to dietary fats that contain a number of different saturated fatty acid molecules that are esterified either at the same or at different glyceryl carbons (sn-1, sn-2 or sn-3 structural isomer locations) within the triglyceride molecule (and/or mono- or di-glyceride molecule). Because human clinical studies involving large numbers of subjects and differing diets are very costly and labor-intensive, and because there are so many experimental variables of interest, there is a limited amount of experimental data relating to the effect on lipoprotein metabolism of dietary saturated fatty acids of differing molecular weights (i.e., 10, 12, 14, 16, and 18 carbons per fatty acid). There is also minimal clinical research data in which differing sn-1, sn-2 and sn-3 triglyceride structural isomers of dietary triglycerides have been constructed and fed to human subjects over a period of time, in which these isomers contain fixed amounts of specified saturated fatty acids located at different glyceryl carbons.

Thus, this invention further concerns compositions and methods for selectively increasing the plasma level of HDL "good" cholesterol (HDL-C) and decreasing the level of LDL "bad cholesterol (LDL-C) by consuming a substantially cholesterol-free nutritional fat or oil-based composition which contains an appropriate amount of sn-2 myristic acid but with low sn-2 palmitate and sn-2 laurate and with an appropriate balance of linoleic acid, oleic acid, and saturated fatty acids.

A few investigators have recently proposed that myristic acid could be incorporated into the triglyceride structure at the sn-2 position (i.e., middle glyceryl ester position) to improve the health quality of dietary fats by causing an increase in the level of HDL cholesterol. Conversely, it is believed that the amount of this fatty acid can be minimized at the outer sn-1 and sn-3 positions of the triglyceride. This is because lipase enzymatic cleavage during fat digestion removes the outer fatty acids while leaving most of the sn-2 fatty acid intact on the glycerol backbone to be absorbed into the bloodstream as a monoglyceride. Accordingly, a number of researchers have prepared dietary fats enriched with milk-fat in which much of its 10% by weight myristic acid is located, by nature, at the sn-2 position of the triglyceride molecule. However, milkfat also contains approximately 26% by weight palmitic acid (16 carbon saturated fatty acid) that is also preferentially located at the sn-2 position. While sn-2 palmitic acid in breast milk may be beneficial to newborns, its benefit to adults is questionable.

As an alternative to using milkfat as a source of sn-2 myristic acid, triglyceride structural isomers with sn-2 myristate can also be produced using the free fatty acid of myristate in interesterification reactions with natural and/or synthetic fats. Structural rearrangement of natural and synthetic triglycerides that contain myristic acid at the sn-1 and sn3 positions can also be used to move some of the myristate to the sn-2 position. For example, interesterification can be used to randomize the distribution of myristic acid over the three positions of the triglyceride molecule. Researchers have proposed that regular dietary intake of fats containing sn-2 myristate may allow the human lipoprotein regulatory system to respond by beneficially increasing plasma HDL-cholesterol levels. While some nutritional experiments have explored the use of different levels of sn-2 myristic acid in dietary fats, few investigators have systematically adjusted the level of other dietary fatty acids (saturated, monounsaturated and polyunsaturated) in concert with sn-2 myristic acid so as to further improve the dietary fat, and further increase the HDL cholesterol level and the HDL/LDL ratio, and none have recognized the advantageous balance characterizing the present invention.

B. Clinical/Nutritional Studies

Obstacles in carrying out dietary experiments include the requirement for substantial amounts of synthetic dietary fats that contain specific fatty acids integrated into the fat molecule at specific positions, as well as stringent control over the subjects' intake of dietary fats. Nevertheless, in one such study, Sanders et al. (Am J Clin Nutr 2003; 77:777-782) provided two similar meals to 17 healthy adult males (meals at least 1 week apart) containing 50 g of fat consisting of either unrandomized (normal) cocoa butter (abbreviated N-cbutter) or randomized (interesterified) cocoa butter (abbreviated IE-cbutter). These two fats were produced from a single batch of cocoa butter, therefore providing the same fatty acid composition but different structural isomers exhibiting different melting points (35° C. for N- and 50° C. for IE-cbutter). While almost all the palmitic and stearic saturated fatty acids in N-cbutter are located at the sn-1 and sn-3 positions, the interesterification process randomized the locations of fatty acids such that 22% of the resulting triglyceride molecules contained palmitic acid (10%) and stearic acid (12%) at the sn-2 position, thereby increasing the melting point of the fat. This nutritional study compared only the short term changes (3 and 6 hour postprandial) in the plasma levels of lipoproteins and fats. Remarkably, in the 6 hour period following each meal there were no measurable changes in TC and HDL cholesterol levels, but within 3 hours following the meals the increments in plasma palmitic, stearic and oleic acids (mmol/L) were as much as three-fold greater for N-cbutter than for IE-cbutter. This observation suggests that enzymatic digestion and absorption work much more efficiently on natural cocoa butter than interesterified cocoa butter with its higher melting point that is significantly above body temperature. The study also suggests that meaningful dietary-related changes in TC and HDL cholesterol levels cannot be expected after single meals. Indeed, four week dietary regimens are typically recommended for establishing steady state lipoprotein levels in the plasma.

In another nutritional study examining the lipoprotein response to a saturated fatty acid located at different positions in the triglyceride molecule, Nelson et al. (Am J Clin Nutr 1999; 70:62-69) studied full term infants that were fed formula from birth to 120 days, where the formula contained 25-27% palmitic acid (16:0) in which either 6% of the 16:0 (standard fat formula) or 39% of the 16:0 (synthesized fat formula) was esterified at the sn-2 glyceryl carbon. The standard fat formula was made from a blend of natural fats including palm olein, soybean, sunflower and coconut whereas the synthesized fat formula (having a fatty acid composition nearly identical to the standard fat) was termed "Betapol-2" (manufactured by Loders Croklaan, Inc., The Netherlands). Betapol-2 contained interesterified palm oil in which a considerable portion of the 16:0 had been moved to the sn-2 glyceryl carbon. Other infants were breast-fed, in which the breast milk contained 23% 16:0 of which 81% by weight was esterified at the sn-2 position. Blood samples were obtained at 30 and 120 days, and plasma lipoproteins fractionated and assayed. The triacylglycerol-rich lipoproteins/chylomicrons were fractionated by ultracentrifugation and the lipid again assayed for percentage of 16:0 in the sn-2 position of the triglyceride from standard fat-fed, synthesized fat-fed and breast milk-fed infants. Accordingly, from the blood samples, 8.3%, 15.8% and 28.0% of the 16:0 was recovered in the sn-2 position for standard fat formula, interesterified fat formula and breast milk respectively. The authors suggest that about 50% of the original 16:0 fatty acid located at the sn-2 position is conserved through the process of sn-1, sn-3 pancreatic lipase hydrolysis, intestinal absorption of the sn-2 monoglyceride and triglyceride reassembly. More interestingly, plasma cholesterol, triglycerides, fatty acids, as well as apoA-I and apo B were measured. Infants fed the interesterified Betapol-2 showed a significantly poorer lipoprotein profile with lower plasma HDL cholesterol and apo A-1 as well as higher apo B levels associated with LDL cholesterol, while infants fed the natural standard formula showed similar total cholesterol levels but beneficially higher HDL levels after 120 days (1.6 vs. 1.2 mmol/L) and higher apo A-1 levels (127 vs. 100 mg/L). This study raises potential concerns over the use of interesterified, as compared with natural saturated fats.

An extensive current review by Karupaiah et al. (Nutrition and Metabolism; 2007, 4:16, entitled "Effects of stereospecific positioning of fatty acids in triacylglycerol structures in native and randomized fats: a review of their nutritional implications" discusses a large body of research relating to nutrition and the modulation of lipoprotein metabolism resulting from alterations in the positioning of fatty acids in triglycerides, and is relevant in understanding the context of the present invention. It is incorporated herein by reference in its entirety.

Applicant has found a small number of animal and human nutritional studies that have investigated changes in plasma HDL and LDL cholesterol levels when dietary fats are provided that contain at least a portion of the myristic acid (14:0) at the sn-2 glyceryl carbon of the triglyceride molecule. For example, Temme et al. (J. Lipid Res. 1997; 38:1746-1754) describe a human clinical study with 60 subjects consuming test fats (40% of the dietary energy) for 6 weeks following a run-in period. During this run-in, the subjects consumed a diet enriched with a high oleic acid margarine containing 24% saturated fat (essentially free of myristate), 70% oleic acid and 6% linoleic acid. During the study, 63% of the dietary fat (25% of energy) was replaced by either the high oleic margarine or a synthetic fat made by interesterifying 34% palm stearin, 17% high oleic sunflower oil, 9% sunflower oil and 40% trimyristin to provide a fat containing 64% saturated fatty acids, 26% monounsaturates (oleic acid) and only 9% polyunsaturates (linoleic acid). Accordingly, the myristic acid accounted for 40%×25% energy=10% energy, while the sn-2 myristic acid statistically accounted for ⅓ or 3.3% energy or ⅓×40%×63%=8% of the dietary fat. With 34% palm stearin present along with the 40% trimyristin in the interesterification mixture, a substantial proportion of the sn-2 fatty acids were palmitic acid along with myristic acid. Subjects' lipids and lipoprotein levels were measured, and showed an average net increase in TC (10.6%), HDL (8.6%) and LDL (14.7%) cholesterol. Unfortunately, both the LDL/TC cholesterol ratio and the LDL/HDL ratio increased. The former increased from 0.608 to 0.622 while the latter increased from 2.06 to 2.18.

In a separate human study by Dabadie et al. (J. Nutr. Biochem. 2005; 16(6): 375-382) 25 healthy monks were fed two diets for 5 weeks each respectively providing 30% and 34% of the calories from fat, in which 8% and 11% of these calories came from saturated fatty acids with 0.6% and 1.2% coming from myristic acid representing 2.5% and 3.5% by weight of the fat. PUFAs (as linoleic acid) accounted for 6.3% of the calories representing approximately 20% by weight of the fat for both diets. While no increase in HDL was reported, other beneficial effects were noted including a decrease in TC, LDL cholesterol and triglycerides, and a beneficial increase in the apo A-1/apo B ratio.

In another human study by Dabadie et al. (Br. J. Nutr. 2006; 96(2): 283-289) 29 healthy monks were fed two diets (33% and 36% of the dietary calories from fat) for 3 months in which myristic acid provided 1.2% and 1.8% of calories, alpha-linolenic acid provided 0.9%, and linoleic acid provided 4.5% of calories (approximately 14% by weight of the dietary fat). In the baseline diet, myristic acid provided 1.2% of calories, alpha-linolenic acid provided 0.4% of calories, and linoleic acid provided 5.5% of calories. Much of the myristic and alpha-linolenic acids were reported to be in the sn-2 triglyceride position. Diet 1 (with 3.7% by weight myristic acid) produced a small decrease in TC, LDL-C, HDL-C, TG and the TC/HDL-C ratio, while diet 2 (with 4.7% by weight myristic acid) produced no decrease in TC or LDL-C, but a small decrease in TG and the TC/HDL-C ratio, and a small increase (6%) in HDL-C.

Both of the above studies by Dabadie et al. employed milkfat as the source of sn-2 myristic acid. In the first study the weight ratio of saturated fat:monounsaturated fat:polyunsaturated fat (abbreviated S:M:P) in the test fats was maintained at approximately 30%:45%:25%, and in the second study approximately 34%:41%:25% with linoleic acid (18:2) representing approximately 15%-20% of the fat. Unfortunately the 2%-5% by weight levels of myristic acid in these dietary fats are small when compared to the 12%-17% by weight palmitic acid in these same fats, in which the palmitic acid, like the myristic acid, is preferentially located at the sn-2 position in the triglycerides. Accordingly, it is difficult to interpret what lipoprotein changes measured were being caused by which of the fatty acids located at the sn-2 position.

Similarly, in a hamster study by Loison et al. (Br. J. Nutr. 2002; 87:199-210), as much as 2.4% of the total dietary energy for the rodents was provided by myristic acid from milkfat and/or lard in which much of the myristic acid is located in the triglyceride sn-2 position. As the investigators increased the level of myristic acid stepwise from 2% to 4% to 6.5% and to 8.5% of the dietary fat, the levels of monounsaturated fatty acids (as oleic acid) and polyunsaturates (predominantly as linoleic acid) were maintained approximately constant at 40-45% and 9-10% by weight of the fat, respectively. Only the levels of saturated fatty acids varied appreciably where, as the level of myristic acid was increased stepwise from 2% to 8.5% by weight, the level of stearic acid decreased from 14% to approximately 6% by weight. In this hamster study, the authors demonstrated substantial increases in both the HDL cholesterol levels and the ratios of HDL to non-HDL cholesterol when myristic acid was partially replacing stearic and palmitic acids. Interestingly, the levels of the non-HDL cholesterol (representing LDL-C+VLDL-C) remained relatively constant as the dietary level of myristic acid level was increased.

While the above results are interesting, the fatty acid compositions provided by Loison et al. cannot be used for constructing the presently invented fat compositions for several reasons. The dietary fats of Loison et al. contain a variety of other saturated fatty acids located at the sn-2 position besides myristic acid, including palmitic and lauric acids, at levels that are significantly higher than myristic acid, and the investigators did not investigate the degree to which these negatively impacted the plasma cholesterol profile. Also, their fats incorporated milkfat and lard, two animal fats containing substantial levels of cholesterol that would have negatively impacted the plasma cholesterol profile. Furthermore, the investigators failed to consider adjusting the level of polyunsaturated fatty acids, for example, while maintaining a constant level of sn-2 myristate. Applicant believes that testing these important variables would have significantly affected their resulting lipoprotein profiles.

As discussed above, a number of studies suggest that sn-2 myristic acid may alter the level of cholesterol-containing lipoproteins including LDL, VLDL and HDL cholesterol. However, it is not clear whether only the sn-2 myristate level in a dietary fat is critical and what role other saturated, monounsaturated and polyunsaturated fatty acids play in increasing HDL-C and decreasing the LDL-C/HDL-C ratio. For example, in a somewhat different system, Sundram et al. in U.S. Pat. No. 5,578,334, No. 5,843,497, No. 6,630,192 and No. 7,229,653 showed that linoleic acid (18:2)-containing fat could be added to a saturated fat (palm oil) that contained high levels of palmitic acid located in the sn-1 and sn-3 positions of the triglyceride molecules to beneficially decrease LDL-C. At the same time, the palm oil-related increase in HDL-C would persist if the level of linoleic acid was not excessive, i.e., if it remained within the range of 15% to 40% by weight of the dietary fatty acids while the saturated fatty acids remained within the range of 20% to 40%. However, the above-cited patents of Sundram et al. do not consider saturated fatty acids at any stereoisomer position including the sn-2 position, and do not suggest or predict what would happen if their cholesterol-free saturated fatty acids (typically provided by palm oil with sn-1 and sn-3 palmitic acid) are replaced by sn-2 myristic acid from interesterified fats. Indeed, there is no suggestion by Sundram et al. to replace palmitic acid in any of their compositions with myristic acid.

Notwithstanding recent lipoprotein research involving myristic acid, Applicant has discovered an extensive body of much earlier clinical data published in 1970 by McGandy and Hegsted (Am J Clin Nutr, 23 (10), 1288-1298, 1970) before the importance of HDL cholesterol was recognized and measured. Within the context of the present invention, Applicant has analyzed these data using an equation that allows the calculation of VLDL cholesterol, then HDL cholesterol and the ratio of LDL/HDL cholesterol. Surprising and unanticipated results beyond those originally described and understood by McGandy et al. have emerged from the recalculation of their data, leading to a better understanding of the role of sn-2 saturated fatty acids and the role of other dietary fatty acids in regulating the HDL cholesterol level and the ratio of HDL to LDL cholesterol.

C. Saturated Fatty Acid Selection and Triglyceride Location

As taught by Khosla and Hayes (Biochem. Biophys. Acta, 1083: 46-50, 1991) and by Sundram et al. (see above), among the various saturated fatty acids present in single fats and fat blends that include palm oil, coconut oil and/or palm kernel oil, it is palmitic acid that has been preferred over lauric and myristic acid (see, for example, claims 11 and 12 in U.S. Pat. No. 7,229,653) for providing a favorable human plasma lipoprotein profile. In fact, palmitic acid is present at a level of over 40% by weight in palm oil, and the selection of natural fats and oils according to the teaching of Sundram et al. to increase plasma HDL and the HDL/LDL ratio does not suggest placing myristic acid (14:0) at the sn-2 position of triglyceride molecules. With the exception of milkfat, natural fats and oils that contain substantial levels of myristic acid carry the myristic acid either at the sn-1 position (palm kernel oil) or the sn-3 position (coconut oil) rather than at the sn-2 position. Alternatively, if a modified fat such as an interesterified vegetable fat were prepared as briefly mentioned in Sundram et al., these patents make no suggestion to interesterify a specific fat or fats according to any particular procedure that would place myristic acid at the sn-2 position of triglyceride molecules.

For a human dietary fat, it is intriguing to consider the possibility that the glyceryl ester location of a saturated fatty acid among the sn-1, sn-2 and sn-3 positions within the triglyceride molecule may affect the HDL and LDL levels in different ways and to different extents, with differing health consequences. It is also intriguing to consider the possibility that substituting one saturated fatty acid for another saturated fatty acid of differing carbon chain length (such as C14 myristate for C16 palmitate) at any one of the three glyceryl ester locations may also affect HDL and/or LDL levels in different ways and to different extents. There have been a number of research studies in which a dietary fat rich in one saturated fatty acid has been replaced by a dietary fat rich in another saturated fatty acid (e.g., replacing coconut fat rich in lauric and myristic acids by palm oil rich in palmitic acid).

However, in the context of the present invention, there have been only a small number of human dietary studies in which HDL and LDL cholesterol levels have been monitored, comparing two (or more) similar dietary fat compositions in which a defined level of one saturated fatty acid with a defined triglyceride structure is replaced by a second saturated fatty acid with a similar triglyceride structure. For example, a dietary study that compares the lipoprotein profile of people consuming natural palm oil and then interesterified palm oil would be comparing diets containing the same fatty acids in differing triglyceride structures. Thus, oleic acid (18:1) that predominates at the sn-2 position in natural palm oil would be partially displaced during interesterification by palmitic acid that originally predominates at the sn-1 and sn-3 positions in natural palm oil.

However, in 1970 McGandy and Hegsted (Am J Clin Nutr, 23 (10), 1288-1298, 1970) published an elegant clinical study with 18 human subjects who were followed for 1.5 years, in which normal dietary fats were replaced by semisynthetic triglycerides providing 38% of the total daily calories. Each fat-containing diet was fed to subjects for a 4 week period in a random sequence of 30 dietary fat formulations. These semisynthetic fats were produced by interesterifying 25% by weight of individual saturated fatty acids (in the form of series of trisaturated triglycerides C12 through C18) with 75% by weight natural vegetable oils low in saturated fatty acids (either olive or safflower oil).

In some other fat-containing diets, 60% by weight C10 saturated fatty acid (as trisaturated C10 medium chain triglycerides, aka, "MCT oil") was first interesterified with 40% by weight of the longer chain saturated fatty acids (as trisaturated triglycerides C14 through C18) to form "60-40 interesterified C10-SFA" products. Subsequently, either 50% or 80% by weight of these "60-40 interesterified C10-SFA" products were blended with the balance (i.e., either 50% or 20% by weight) of vegetable oil (either olive or safflower oil).

Serum samples were obtained from the subjects on days 24 and 28 for assay of total cholesterol (abbreviated TC), beta-lipoprotein cholesterol, lipid phosphorous, and triglyceride levels (abbreviated TG). For each subject and each assay, an average value (based upon two samples) was calculated. For each subject, changes in these average values were calculated for each dietary fat, and then mean changes from the baseline "Average American Diet" (A.A. Diet) was calculated for the whole group of subjects.

At the time of the 1970 publication by McGandy et al., while beta-lipoprotein was understood as "bad" cholesterol (now known as LDL-cholesterol), the concept of HDL as "good" cholesterol was unknown and only elucidated in 1974 by Mahley et al. (Circ. Res. 35:713-721, 1974). The estimation of VLDL cholesterol from the Friedwald equation described in 1972 was also unknown at the time. Applicant is unaware of any attempts to reanalyze the data of McGandy et al. However, based upon the hunch that these data held valuable but undetected information, Applicant calculated the values of VLDL and HDL cholesterol and the LDL/HDL ratios for all dietary groups of subjects using these exceptionally controlled diets and the original data tables of McGandy et al. The calculations are based upon the following equation:

$$\text{HDL-C}=\text{TC}-(\text{LDL-C}+\text{VLDL-C}) \text{ where VLDL}=\text{TG}/5$$
(Friedwald estimate)

The new data estimates based on McGandy et al. are provided in Tables 1 and 2. These data include VLDL-C, HDL-C and LDL/HDL cholesterol ratios. Together with knowledge of lipoprotein metabolism from other sources, it is believed that novel dietary fats can be assembled that will be more effective than those fats described by McGandy et al. in beneficially increasing plasma HDL-C while decreasing the LDL-C/HDL-C ratio. It is also anticipated that these novel fats will be more effective than those previously described in Sundram et al. in U.S. Pat. No. 5,578,334, U.S. Pat. No. 5,843,497 and U.S. Pat. No. 6,630,192.

The Key to Tables 1 and 2 is as follows:

S:M:P represents the relative proportions of the total dietary energy (in kilocalories, with 38% of the energy provided by fat-abbreviated 38% en), provided by the different categories of fatty acids, saturates (S), monounsaturates (M) and polyunsaturates (P).

P/S represents the weight ratio of polyunsaturated to saturated fatty acids provided in the dietary fat; TC total cholesterol; LDL-C low density lipoprotein associated cholesterol; VLDL very low density lipoprotein associated cholesterol; HDL-C high density lipoprotein associated cholesterol; LDL-C/HDL-C represents the weight ratio of LDL-C to HDL-C.

MCT (10:0) refers to a medium chain triglyceride carrying three saturated fatty acids, each ten carbons in length.

Interesterified MCT+14 (60:40) refers to a fat made by interesterifying 60 parts by weight MCT (10:0) and 40 parts myristic acid (14:0). Similarly Interesterified MCT+16 and MCT+18 refer to the use of palmitic and stearic acids in place of myristic acid.

Interesterified Olive+12 (75:25) refers to a fat made by interesterifying 75 parts by weight olive oil and 25 parts lauric acid (12:0). Similarly, Interesterified Olive+14 (75:25) refers to a fat made by interesterifying 75 parts by weight olive oil and 25 parts myristic acid (14:0). Similarly, Interesterified Safflower+12 (75:25) refers to a fat made by interesterifying 75 parts by weight safflower oil and 25 parts lauric acid (12:0).

Blends (MCT+14): Safflower (80:20) refers to a fat blend made by mixing 80% by weight of the interesterified MCT+14 product described above, with 20% by weight safflower oil.

By analogy, Blends (MCT+16): Olive (50:50) refers to a fat blend made by mixing 50% by weight of the interesterified MCT+16 product described above, with 50% by weight olive oil.

Results from Table 1 and Table 2.

In the uppermost panel of Table 1 it is apparent that as the P/S ratio for edible dietary fats increased, the level of HDL increased and the ratio of LDL to HDL cholesterol decreased for these 20 subjects consuming 38% of their calories from these fats. This is lipoprotein improvement is not surprising, considering safflower oil compared to butter.

In the second panel of Table 1, it is apparent that 14:0 and 16:0 fatty acids rather than 18:0, when interesterified with MCT (10:0) produce healthier interesterified fat products based upon the higher HDL and lower LDL/HDL ratios for these subjects. The 14:0 interesterified fat is also healthier than the original 100% MCT triglyceride based on these same criteria. Since sn-1 and sn-3 fatty acids are cleaved during digestion, it appears likely that the remaining sn-2 monoglyceride with its 14:0 is healthier than the sn-2 monoglyceride containing 10:0. This result only became apparent with the calculation of HDL herein.

The third panel of Table 1 presents results in which the dietary fat is 75% by weight olive oil interesterified with 25% by weight of various saturated fatty acids ranging from 12:0 to 18:0. Although Applicant believes that the proportion of polyunsaturated fatty acids (9% by weight) in the dietary fat is inadequate, it is interesting that the HDL-C level is highest for the 14:0 product, and the LDL/HDL ratio is lowest. This result again suggests that sn-2 myristic acid has the greatest potential in formulating a dietary fat that can provide maximum levels of HDL-C and the best ratio of good to bad cholesterol.

The fourth panel results in Table 1 are much like the third panel except that 75% by weight safflower oil containing a large proportion of linoleic acid (68% by weight) was substituted for 75% olive oil in the interesterification reaction to produce the dietary fat that contained approximately 50% polyunsaturated fatty acids. As a result, most of the absolute values of LDL-C and HDL-C are lower than the corresponding values with olive oil because high levels of linoleic acid can depress both LDL-C and HDL-C levels. The LDL-C/HDL-C ratios are also somewhat compromised (undesirably higher than those with olive oil) suggesting that the 50% level of linoleic acid in the interesterified products is excessive. This compares with the 9% level with olive oil (see above). From these data it is apparent that the level of linoleic acid in a dietary fat that will maximize HDL-C while minimizing the ratio of LDL-C/HDL-C lies somewhere between 10% and 50%, and probably closer to 15%-20% by weight of the dietary fat. The unusually low LDL-C level for the interesterified 18:0-safflower oil product (129 mg/dL) is also remarkable. This suggests an atypical response associated with high 18:0 interesterification that awaits further investigation.

The data presented in Table 2 are more difficult to interpret. Panel 1 repeats the data provided in Table 1 to provide a baseline cholesterol and lipoprotein response of subjects to interesterified trisaturated triglycerides [e.g., MCT+14 (60:40), representing 60 parts of 10:0 interesterified with 40 parts of 14:0]. Panels 2 and 3 provide the corresponding responses of subjects consuming these same interesterified trisaturates but blended either 80:20 or 50:50 with safflower oil (68% 18:2 linoleic acid) in Panel 2, and olive oil in Panel 3 (olive oil: 11% 18:2 linoleic acid+70% monounsaturated oleic acid).

Comparing line by line of data in Panel 2 with that in Panel 1, it is clear that the addition of polyunsaturated vegetable oil to a trisaturated fat-rich diet decreases LDL-C and VLDL-C while increasing HDL-C. Consequently, the resulting LDL/HDL cholesterol ratios decreased.

It is difficult to see a comparable pattern when similarly comparing the data in Panel 3 with Panel 1. It is evident that adding an oleic acid-rich vegetable oil (olive) to a diet rich in trisaturated fat does not offset the cholesterolemic properties or improve the lipoprotein profile of the diet to the same degree as a polyunsaturated vegetable oil (safflower) i.e., MONOS do not work well by themselves against SATS. On the other hand, the 50:50 blends with olive oil show a substantial improvement in lipoprotein profile over the blends containing only 20% olive oil. Applicant notes that the 50:50 blends contain 6% linoleic acid while the 80:20 blends contain only 2%. It is likely that the higher 18:2 level is substantially more effective in reducing LDL and increasing HDL cholesterol, implying that a critical mass of linoleic acid is necessary to make any calculated lipoprotein improvement a reality.

In summary, the data in Tables 1 and 2 derived from McGandy et al. show both original and newly calculated lipoprotein levels in human subjects, and show changes in these levels for subjects whose diets include changes from one dietary fat to another, from highly saturated MCTs, to MONOS, to highly unsaturated POLYS (by moving from one line of data to the next in Tables 1 and 2). Unlike any of the other prior art studies, these data are particularly valuable because they show lipoprotein changes brought about by a change from one saturated fatty acid to another in otherwise identical dietary fats, where the saturated fatty acid is also being esterified into the sn-2 position of triglyceride molecules. At the time, McGandy et al. thought they were exclusively testing the simple addition of specific SFAs into set amounts of SFA, MUFA or PUFA, and did not anticipate that their design would also encompass the issue of triglyceride molecular structure. By focusing on their unique modulation of individual saturated fatty acids, it is possible to definitively conclude that myristic acid was the most effective saturated fatty acid in the sn-2 position for beneficially and maximally increasing HDL-C in most situations. At the same time, Applicant finds that sn-2 myristic acid significantly reduces LDL-C, depending upon the reference diet that is being considered. For example, in panel 3 of Table 1, the LDL-C value of 149 mg/dL for the interesterified dietary fat "Olive+14" is identical to that for simple olive oil, but when compared to the other interesterified fats in the same group (that differ only in the saturated fatty acid chain length) was beneficially and significantly lower even as the associated HDL-C was remarkably higher.

The newly calculated lipoprotein data after McGandy et al. lead to a conclusion that differs from the prior art. Others have used milkfat in dietary fat blends to provide sn-2 myristate and improve the lipoprotein profile in human and other mammalian plasmas. However, it is now apparent from the recalculated data of McGandy et al. that the "non-myristate" saturated fatty acids including lauric acid (12:0) and palmitic acid (16:0) in the sn-2 position of triglyceride molecules (present in milkfat) reduce/compromise the increased HDL-C level and conversely increase the LDL-C/HDL-C ratio. Thus milkfat that contains nearly three times more palmitic acid than myristic acid in the sn-2 position is the wrong choice for an ideal fat. Applicant believes that for an added dietary fat to be effective in improving human lipoprotein profiles over a broad population, it should contain more sn-2 myristic acid than sn-2 palmitic acid (and also more sn-2 myristic acid than sn-2 lauric acid). Moreover, milkfat is also problematic because it contains a substantial level of cholesterol (at least 0.25% by weight) that boosts plasma LDL-C while diminishing HDL-C. Stripping milkfat of its cholesterol would be helpful in this regard, but that would not reduce the level of palmitic acid. On the other hand, considering the saturated commercial vegetable fats, none of these contain appreciable amounts of myristic acid in the sn-2 position. Those that contain significant levels of myristic acid (coconut oil and palm kernel oil) also contain lauric acid at levels nearly threefold greater than myristic, and the lauric acid rather than the myristic acid is preferentially esterified at the sn-2 position. Therefore, in this case, isomeric randomization by same fat-interesterification is not a good option either.

Considering the limited options with currently available technology, Applicant has concluded that interesterification that combines myristic acid and/or trimyristin on the one hand, and either oleic acid/triolein or at least one oleic acid-rich vegetable oil (e.g., varieties of canola, soybean or sunflower oil with medium to high levels of oleic acid) on the other hand, is a viable option for producing sn-2 myristate-containing triglycerides in which at least one of the three fatty acids should be unsaturated.

TABLE 1

Cholesterol Response in Humans to Fats of Different Saturation

| Fat | S:M:P (%) (38% en) | P/S | TC mg/dl | LDL-C mg/dl | VLDL-C mg/dl | HDL-C mg/dl | LDL-C/ HDL-C |
|---|---|---|---|---|---|---|---|
| Butter | 24:13:02 | 0.08 | 254 | 196 | 16 | 43 | 4.6 |
| A.A. Diet | 19:13:06 | 0.32 | 221 | 154 | 16 | 51 | 3.0 |
| Olive | 7:27:04 | 0.57 | 217 | 149 | 13 | 55 | 2.7 |
| Safflower | 5:07:26 | 5.2 | 178 | 116 | 12 | 50 | 2.3 |
| MCT (10:0) Interesterified | 34:03:01 | 0.03 | 214 | 148 | 24 | 41 | 3.6 |
| MCT + 14 (60:40) | 34:03:01 | 0.03 | 253 | 181 | 18 | 54 | 3.4 |
| MCT + 16 (60:40) | 34:03:01 | 0.03 | 267 | 193 | 19 | 55 | 3.5 |
| MCT + 18 (60:40) | 34:03:01 | 0.03 | 226 | 162 | 19 | 45 | 3.6 |
| Olive Interesterified | 7:27:04 | 0.57 | 217 | 149 | 13 | 55 | 2.7 |
| Olive + 12 (75:25) | 15:19:04 | 0.24 | 230 | 157 | 12 | 61 | 2.6 |
| Olive + 14 (75:25) | 15:20:04 | 0.25 | 234 | 150 | 17 | 67 | 2.2 |
| Olive + 16 (75:25) | 14:20:04 | 0.26 | 233 | 165 | 13 | 55 | 3 |
| Olive + 18 (75:25) | 14:21:04 | 0.26 | 233 | 160 | 16 | 58 | 2.8 |
| Safflower Interesterified | 5:07:26 | 5.2 | 178 | 116 | 12 | 50 | 2.3 |
| Safflower + 12 (75:25) | 13:06:19 | 1.5 | 192 | 135 | 11 | 46 | 2.9 |
| Safflower + 14 (75:25) | 13:06:19 | 1.5 | 201 | 132 | 16 | 53 | 2.5 |
| Safflower + 16 (75:25) | 13:06:19 | 1.5 | 206 | 149 | 11 | 46 | 3.3 |
| Safflower + 18 (75:25) | 12:07:19 | 1.5 | 202 | 130 | 15 | 57 | 2.3 |

TABLE 2

Cholesterol Response in Humans to Fats of Different Saturation

| Fat | S:M:P (%) (38% en) | P/S | TC mg/dl | LDL-C mg/dl | VLDL-C mg/dl | HDL-C mg/dl | LDL-C/ HDL-C |
|---|---|---|---|---|---|---|---|
| Interesterified | | | | | | | |
| MCT + 14 (60:40) | 34:03:01 | 0.03 | 253 | 181 | 18 | 54 | 3.4 |
| MCT + 16 (60:40) | 34:03:01 | 0.03 | 267 | 193 | 19 | 56 | 3.5 |

TABLE 2-continued

Cholesterol Response in Humans to Fats of Different Saturation

| Fat | S:M:P (%) (38% en) | P/S | TC mg/dl | LDL-C mg/dl | VLDL-C mg/dl | HDL-C mg/dl | LDL-C/ HDL-C |
|---|---|---|---|---|---|---|---|
| MCT + 18 (60:40) Blends Safflower:MCT + 14) | 34:03:01 | 0.03 | 226 | 162 | 19 | 45 | 3.6 |
| (20:80) | 28:04:06 | 0.21 | 252 | 175 | 15 | 62 | 2.8 |
| (50:50) Safflower:(MCT + 16) | 20:05:13 | 0.68 | 207 | 147 | 14 | 46 | 3.2 |
| (20:80) Safflower:(MCT + 18) | 28:04:06 | 0.22 | 242 | 159 | 14 | 69 | 2.3 |
| (20:80) | 28:04:06 | 0.22 | 235 | 170 | 19 | 46 | 3.7 |
| (50:50) Blends Olive:(MCT + 14) | 19:05:14 | 0.70 | 208 | 144 | 15 | 49 | 2.9 |
| (20:80) | 29:08:02 | 0.06 | 252 | 186 | 15 | 51 | 3.6 |
| (50:50) Olive:(MCT + 16) | 21:15:03 | 0.13 | 234 | 159 | 15 | 60 | 2.6 |
| (20:80) Olive:(MCT + 18) | 28:08:02 | 0.06 | 242 | 168 | 15 | 59 | 2.8 |
| (20:80) | 28:08:02 | 0.06 | 240 | 177 | 19 | 44 | 4 |
| (50:50) | 20:15:03 | 0.13 | 227 | 147 | 15 | 65 | 2.3 |

D. Advantageous Fat Compositions

Thus, in view of the discussion above, preferably in the fat composition at least 3% by weight of the composition is sn-2 myristic acid, while the amounts of sn-2 palmitate and sn-2 laurate are minimized. The composition also preferably includes between 10% and 40% by weight linoleic acid (helping to lower LDL-C), between 15% and 40% by weight total saturated fatty acids, and between 30% and 65% by weight oleic acid. Oleic acid is considered an essentially "neutral" fatty acid that dilutes the saturated and polyunsaturated fatty acids that are more biologically active in raising and lowering lipoprotein levels. The ratio of sn-2 myristic acid to sn-2 palmitic acid, and the ratio of sn-2 myristic acid to sn-2 lauric acid are both greater than 1:1. The sum of weight percentages for saturated, monounsaturated and polyunsaturated fatty acids equals 100%.

The rationale for utilizing the above triglyceride composition as a component or replacement for a significant portion of ones dietary fat is as follows:

1. There is an extensive body of clinical evidence that dietary intervention with edible fats and oils that increase plasma levels of HDL cholesterol, while decreasing the LDL-C, VLDL-C levels, and the ratio of LDL-C to HDL-C all provide substantial health benefits in terms of reducing the risk of coronary heart disease and other health problems.
2. Applicant has found new evidence that intake of dietary fat providing between approximately 3% and 20% of the total fat as sn-2 myristic acid is beneficial, in spite of variable and sometimes contradictory increases and decreases in HDL-C, LDL-C and LDL/HDL ratios (e.g., see Dabadie et al. and Temme et al.) with sn-2 myristate relative to control diets. It is hypothesized these inconsistencies are caused by variable intake of non-myristate sn-2 saturated fatty acids (i.e., sn-2 palmitate and laurate) as well as variable intake of polyunsaturated fatty acids (18:2).

Applicant has calculated HDL-C data from early 1970 clinical experiments of McGandy et al. when HDL "good" cholesterol was unknown, in which essentially all dietary saturated fatty acid intake was controlled. It has become evident herein, for the first time (see Table 1 and 2 below), that with an otherwise invariant fatty acid-containing diet, sn-2 myristate can more predictably boost HDL-C and reduce the LDL-C/HDL-C ratio than other saturated fatty acids at the sn-2 position, which typically degrade or diminish these lipoprotein indices. The sn-2 myristic acid effect on the lipoprotein profile appears most relevant when many or most of the neighboring fatty acids in the triglyceride molecules are oleic acid. These particular results were obtained by McGandy et al., when 75 parts olive oil were interest-erified with 25 parts myristate. When compared with an olive oil-rich diet alone, the diet with semi-synthetic interesterified myristic acid-olive oil surprisingly did not alter plasma LDL-C levels (149 versus 150 mg/dL) even though it increased HDL-C from 55 to 67 mg/dL.

3. Together with the novel findings calculated from McGandy et al., Applicant re-evaluated other animal and human clinical data, and determined that trisaturated triglycerides, especially tripalmitin and to a somewhat lesser degree trimyristin, are cholesterolemic in elevating TC and LDL-C (Snook et al., Eur. J. Clin. Nutr. 1999, 53: 597-605) and should be minimized in the diet (also see Mukherjee et al. J. Atheroscler. Res. 1969, 10(1): 51-54). The waxy high melting point tristearin triglyceride molecule appears to be an exception, in part because it is poorly digested.

Accordingly, it has been deduced that the stoichiometric ratios of fatty acids (including myristic acid/trimyristin) combined in interesterification reactions should be chosen to minimize the formation of trisaturated triglycerides. This can be accomplished for example by including a sufficient amount of oleic acid in the reaction to act as diluent molecules. It is suggested that triglycerides with either one or two saturated fatty acids (but not three) can be produced by interesterification, and are suitable for increasing sn-2 myristic acid levels in dietary fats. Therefore, the stoichiometric ratio of oleic acid (or ratio of oleic acid plus linoleic acid) to myristic acid residues should approach 1:1, and preferably somewhat greater than 1.0/1.0 to keep trimyristin triglyceride concentrations below 10% by weight. For example, in a 1:1 interesterification mixture of oleic (O) and myristic acid (M) residues, approximately ⅛ of the molecules are trimyristin (MMM) if the eight (sn-1-sn-2-sn-3) triglycerides are randomly constituted as OMM, MOM, MMO, MOO, OMO, OOM, OOO, and MMM.

4. The proportion of polyunsaturated fatty acids, i.e., linoleic acid, to be used in a dietary fat composition is also an important consideration. The concept of balanced fatty acids between polyunsaturated and saturated fatty acids is described by Sundram et al. in a series of U.S. patents cited above, with the proportion of linoleic acid being set between 15% and 40% by weight and the total saturates being set between 20% and 40% by weight. Considering the information herein from the re-analysis of McGandy et al., it is believed that the range of linoleic acid in a dietary fat can be modestly expanded to between 10% and 40% by weight. This is based upon the observation that adding as little as 8% by weight linoleic acid (provided by 75% by weight olive oil) to an interesterified fat that contained 25% by weight myristic acid, substantially increased HDL-C while decreasing LDL-C, as compared to the components alone (see "olive oil" and "MCT+14" in Table 1). It is suggested that 10% to 20% linoleic acid is the preferred range of linoleic acid for balancing between 15% and 40% by weight of total saturated fatty acids in the dietary fat.

Surprisingly, and contrary to conventional nutritional teaching, indefinitely higher levels of polyunsaturates are not better. That is, when the level of polyunsaturated fatty acids is increased above that level required for achieving "balance", the lipoprotein profile becomes degraded. This is evident in Table 1, comparing homologous interesterified fats all made with 25% saturated fat and either 75% olive oil (8% final linoleic acid in panel 3) or alternatively 75% safflower oil (51% final linoleic acid in panel 4). It is apparent that three out of the four olive oil-containing interesterified fats provided superior lipoprotein profiles based on higher HDL-C and lower LDL-C/HDL-C ratios than those with safflower oil.

The proportion of saturated fatty acids in the dietary fat is also a matter to be considered. Clearly, the level of myristic acid and the proportion of myristate residues in the bioactive sn-2 position of the triglyceride molecule are important. But it is an open question as to whether the overall proportion of saturated fatty acids in the diet is critical (excluding myristate). In the top panel of Table 1 without considering the butter diet, it is apparent that as the saturated fatty acids substantially increase (and the P/S ratio decreases 16-fold from 5.2 to 0.57 to 0.32), the lipoprotein profile is only moderately degraded. That is, the LDL-C to HDL-C ratio increases from 2.3 to 2.7 to 3.0 but the HDL-C levels remain substantially constant (50-55 mg/dL). On the other hand, with the butter diet, the HDL-C value drops dramatically (to 41 mg/dL) and LDL-C increases dramatically (to approximately 200 mg/dL from 150 mg/dL), believed to be in large part because PUFA becomes limiting.

These data also suggest that dietary cholesterol is a more substantial problem than saturated fatty acids in degrading a healthy lipoprotein profile. However, because saturated animal fats in meats and butter are widely consumed and contain substantial levels of cholesterol, and because cholesterol-free saturated vegetable fats (e.g., palm oil) are less common in the American diet, there is a common misconception that all saturated fat is harmful. In fact, in light of the HDL-C and LDL-C/HDL-C data presented in Table 1, it is suggested that the range of total saturated fatty acids in a dietary fat can safely vary between 15% and 40% by weight in the substantial absence of dietary cholesterol and in the presence of adequate PUFA.

5. The proportion of monounsaturated fatty acids, i.e., oleic acid, in the dietary fat represents the remaining content of essentially neutral fatty acids after considering the more biologically active polyunsaturated and saturated fatty acids. As explained above, if the proportion of linoleic acid is added to oleic acid, then the calculated ratio of (oleic acid+linoleic acid) to total saturated fatty acids in the interesterification reaction should approach 1.0:1.0, and preferably exceed 1:1, so as to minimize the formation of trisaturate triglycerides. Accordingly, the dietary fat should contain between 30% and 65% by weight oleic acid depending upon the level of saturated fatty acids in the reaction.

6. The cholesterol concentration in a dietary fat should be minimized to avoid degrading the lipoprotein profile (see problematic butter, panel 1, Table 1). It is preferable that dietary cholesterol not exceed 2 mg per serving as this is the maximum permissible cholesterol level allowed under U.S. FDA regulations for a product to be labeled as cholesterol-free. For a 14 g serving of table spread, this level represents 0.014% by weight cholesterol. By comparison, a low cholesterol food may contain up to 20 mg (0.14% by weight) cholesterol per serving, while butter typically contains 0.22% by weight cholesterol (16-fold higher than a cholesterol-free product).

E. Interesterification Ratios

One objective of the present invention is to provide recipes for making interesterified fats that not only contain sn-2 myristic acid, but also provide other fatty acids that will improve the human lipoprotein profile. Considerations in such recipes not only include the choice of ingredients but also their concentrations that affect the yield of various triglyceride products and the physical properties of the resulting fat such as melting point and crystallization tendency, e.g. beta prime versus beta crystals). Since interesterification involves a relatively random rearrangement process for fatty acids in the triglyceride molecule, the practical percentage yield of sn-2 myristate, based upon input weight of two principal ingredients can vary over approximately a two-fold range. Thus, a 3:1 mixture of trimyristate to trioleate will obviously produce a much greater yield (% by weight) of triglycerides containing an sn-2 myristate than a 1:3 mixture of the same materials. However, the melting point of triglycerides containing a substantial proportion of trimyristate rather than dimyristate and monomyristate is undesirably elevated. Consequently, Applicant favors a stoichiometry in which one part of myristic acid and/or trimyristin is interesterified with between 1 and 3 parts of an oleic acid-rich vegetable oil (or alternatively oleic acid/triolein). McGandy et al. utilized a 75:25 or 3:1 ratio of vegetable oil to saturated fat in synthesizing the "olive+14" dietary fat in Table 1.

There are particular advantages in selecting other interesterification ratios, i.e., stoichiometries, in combining two or more different fats and/or fatty acids. This is illustrated herein by example, when a 1:1 molecular ratio of myristic acid to oleic acid is selected. Such a 1:1 mixture in an interesterified fat can be constituted from trimyristin triglyceride and a high oleic acid vegetable oil such as sunflower oil containing 82% by weight oleic acid currently available from Cargill Inc. (Minneapolis, Minn.). The resulting triglyceride structures produced, for example, from 12 Myristic (M) fatty acids and 12 Oleic (O) fatty acids (where the fatty acids are randomly arranged along the sn-1, sn-2 and sn-3 positions to form 8 different stereoisomer structures, 7 of which contain myristic acid) are as follows: MMM, MMO, MOM, OMM, MOO, OMO, OOM, OOO. Since two and three saturated fatty acids per molecule will produce a "hard fat," i.e., one that has a solid consistency at refrigerator temperature, this interesterification produces approximately 50% hard fat that can be very beneficial in producing margarines and solid shortenings. By contrast, the 75:25 ratio of olive oil and saturated fatty acid, e.g., myristic acid used in the interesterifications described by McGandy et al. produces myristic acid-containing triglycerides that are almost exclusively monosaturated, i.e., OOM, OMO, MOO, and these triglycerides do not function to harden vegetable oils.

The important contribution of McGandy et al. in the production and clinical study of the dietary fats including "olive+14" and "safflower+14" is recognized. However, based upon Applicant's current re-analysis of their data, it is believed that a dietary fat must not only contain at least 3% sn-2 myristate, but must also contain more (preferably at least two-fold more) sn-2 myristate than sn-2 palmitate, and more sn-2 myristate than sn-2 laurate to obtain the benefits of the present invention. This is because sn-2 palmitate and sn-2 laurate appear to negatively affect (increase) the LDL-C/HDL-C ratio (see "Olive+16" and "Safflower+16"). Applicant also finds that the dietary fat compositions provided by McGandy et al. contain either too little linoleic acid (8% with 75:25 "olive+14") or too much linoleic acid (51% with 75:25 "safflower+14") for achieving the objectives described herein, i.e., to maximize the level of HDL-C while minimizing the LDL-C/HDL-C ratio in human plasma. Accordingly, Applicant has increased the required level of linoleic acid above 8% by weight, to a level of linoleic acid between 10% and 40% by weight of the dietary fat. Likewise, Applicant finds that some of the dietary fat compositions of McGandy et al. contain too little oleic acid and too much linoleic acid (14% 18:1 with 75:25 "safflower+14") or plenty of oleic acid but too little linoleic acid (53% 18:1 with 75:25 "olive+14") for achieving an improved lipoprotein profile. Therefore, a higher oleic acid level is used herein, in which the final level of oleic acid in the dietary fat composition is between 30% and 65% by weight so as to maximize the level of HDL-C while minimizing the LDL-C/HDL-C ratio in human plasma.

The studies of Dabadie et al. and Loison et al. discussed earlier are also acknowledged, but both of these groups utilized milkfat in their studies. With milkfat providing more sn-2 palmitic acid than sn-2 myristic acid, their dietary fats are not compatible with the present invention and lipoprotein profiles cannot be optimized. Similarly, the dietary fats of Temme et al. discussed earlier that involved interesterifying high levels of palm stearin, myristin, and very low levels of linoleic acid are not compatible with the requirements of the present invention because substantial levels of sn-2 palmitin are produced that offset the benefits of sn-2 myristin, and because the level of linoleic acid in the dietary fat is inadequate.

While the studies of McGandy et al. provide interesterified fats that are somewhat closer to the requirements of the present invention, the levels of polyunsaturated fatty acids required by the present invention to reduce LDL cholesterol are not met. Furthermore, McGandy et al. does not explore what role interesterification stoichiometry plays in improving the lipoprotein profile. That is, by varying the ratio of oleic acid to myristic acid used for interesterification, it is anticipated that the lipoprotein profile can be altered. More specifically, McGandy et al. used a fixed 1:3 ratio of trisaturated fat to olive oil (70% oleic acid) or safflower oil (68% linoleic acid) to produce interesterified triglycerides containing sn-2 saturated fatty acids (e.g., sn-2 myristate). This stoichiometry produces a predominance of triglycerides containing a single saturated fatty acid. Applicant herein substantially varies this stoichiometric ratio, e.g., upward to approximately 1:1, so as to introduce additional saturated fatty acids into the synthetic/semisynthetic dietary fat during interesterification. This has important consequences when interesterifying a trisaturated triglyceride or a simple saturated fatty acid with either a monounsaturated fatty acid-rich, or a polyunsaturated fatty acid-rich fat. This change produces interesterified triglyceride molecules containing much more disaturated triglycerides. In the case of myristic acid interesterified with a high oleate or high linoleate vegetable oil, two out of the three disaturated triglycerides (with two myristates and one oleate or linoleate) will contain the bioactive sn-2 myristate.

The interesterified dimyristate triglycerides may also serve a second function. As a hard fat, the disaturate triglycerides possess a significantly higher melting point than the monosaturated triglycerides formed by McGandy et al. (with two oleic or linoleic acids and one myristate). The melting point however, remains well below the temperature of the human mouth so that the fat has an excellent mouth feel. This is particularly applicable for making margarine spreads and shortenings for example. Thus, depending upon how the lipoprotein profile is affected by the presence of disaturates, the ratio of myristate to oleate and linoleate can be changed in the interesterification reaction.

F. Definitions

In the context of the present invention and the associated claims, the following terms have the following meanings:

The term "nutritional fat" or "dietary fat" as used herein means any predominantly triglyceride-based edible oil or fat, regardless of whether it is derived or purified from vegetable or animal sources, or is synthetic or semi-synthetic in origin, or some combination of these. A nutritional or dietary fat may also contain other constituents of choice such as monoglycerides, diglycerides, flavorings, fat-soluble vitamins, phytosterols and other edible ingredients, food additives, dietary supplements and the like. As taught in the present invention, a dietary fat or oil-based composition can be formulated by chemically or genetically engineering a fat or oil using chemical or enzymatic interesterification to attach certain fatty acids (or remove certain fatty acids and attach others) to the glyceryl backbone of the fat. A nutritional or dietary fat can be interesterified by chemical and/or enzymatic methods known in the art using defined ratios of carefully controlled ingredients to produce certain predicted triglyceride products as taught herein.

The objective of the present invention is to increase HDL "good" cholesterol, decrease LDL "bad" cholesterol and decrease the ratio of LDL to HDL cholesterol ratio in human plasma.

It is important that the resulting fat-based composition is substantially cholesterol-free because the presence of cholesterol degrades the lipoprotein profile, undesirably increasing LDL cholesterol and increasing the LDL/HDL ratio in the plasma. The term "substantially free" in reference to cholesterol level means that the dietary fat contains less than 10 mg cholesterol per serving of a food containing the dietary fat, more preferably less than 5 mg per serving, and most preferably less than 2 mg per serving to qualify as "cholesterol-free" under current U.S. FDA regulatory standards.

In reference to fatty acids and their attachment to the glyceryl moiety of the triglyceride molecule, there are three hydroxyl positions for esterification of the fatty acids. These positions allow for different triglyceride structural isomers, i.e., stereoisomers to be formed. The three points of attachment known as the sn-1, sn-2 and sn-3 positions have metabolic significance. While the physical properties of the fat (e.g., hardness, melting point crystal structure) are affected by each fatty acid attached at each position, the fatty acid at the middle or sn-2 position has the greatest impact on affecting the level of different plasma lipoproteins. This is because digestion and enzymatic hydrolysis by pancreatic lipase removes the sn-1 and sn3 esterified fatty acids, leaving the sn-2 fatty acid monoglyceride to be absorbed into the bloodstream.

As used herein, unless otherwise specified, percentages and their specified ranges are provided as weight percentage compositions such as "between 10% and 40% by weight linoleic acid."

Dietary fat compositions as provided and calculated herein are expressed in terms of their fatty acid make-up on a weight percentage basis. For simplicity, the total weight percentage of fatty acids in triglyceride-based fats described herein is set to 100% (not ~95% as used in USDA tables). Thus, the ester-linked glyceryl carbon attached to each fatty acid is effectively added to that fatty acid because it facilitates calculations. This concept is described elsewhere herein by the following alternative words: "the sum of weight percentages for saturated, polyunsaturated and monounsaturated fat (and fatty acids) equals 100% (based upon the weights of esterified fatty acids in said composition)."

Current methods of chemical and enzymatic interesterification are not described herein because they are well known in the art and are described in the published literature.

The term "unsaturated fatty acids" as used herein refers to fatty acids containing at least one carbon-carbon double bond, and as such, includes all fatty acids except the saturated fatty acids. The most common unsaturated fatty acids include the monounsaturated fatty acid, oleic acid (18:1), and the polyunsaturated fatty acid, linoleic acid (18:2). The polyunsaturates also include the omega-3 fatty acids a-linolenic acid (18:3, n-3 or ALA), and the so-called long chain omega-3 polyunsaturated fatty acids, eicosapentaenoic acid (EPA) and docosahexaenoic acid (DHA). EPA (20:5, n-3) and docosahexaenoic acid (22:6, n-3) contain 5 and 6 double bonds in carbon chains of 20 and 22 carbon atoms.

EXAMPLES

Interesterified dietary fats were prepared by the Stepan Company (Northfield, Ill.) using random chemical interesterification to combine the following fats or fatty acids and vegetable oils:

Example 1

One part by weight trimyristin and three parts by weight high oleic sunflower oil. The sunflower oil (Cargill Inc., Minneapolis, Minn.) contained approximately 82% oleic acid, 8-9% linoleic acid and 8-9% saturated fatty acids. This interesterified fat closely mirrors the interesterified "olive+14" (75:25) fat of McGandy et al. listed in Table 1 (panel 3). Most of the myristic acid in these triglycerides is found in monomyristin-diolein molecules (liquid oil) whose beta-crystalline melting point is 14° C., i.e., well below room temperature.

Example 2

Same as Example 1 except 3.9 parts trimyristin and 6.1 parts high oleic sunflower oil are incorporated into the interesterified dietary fat. The resulting fat contains approximately 5% by weight linoleic acid and approximately 39% myristic acid, one-third of which (13%) is sn-2 myristic acid. Some of the resulting triglycerides will contain two saturated fatty acids (disaturates) providing a component of fat solids at room temperature.

Example 3

Same as Example 1 except one part trimyristin and one part high oleic sunflower oil are incorporated into the interesterified dietary fat. The resulting fat contains only 4% by weight linoleic acid and approximately 50% myristic acid, one-third of which is sn-2 myristic acid. If the sunflower oil contains approximately 82% by weight oleic acid (as currently available from Cargill Inc., Minneapolis, Minn.), the resulting triglyceride structures with myristic and oleic acids produced by random chemical interesterification/rearrangement include 8 principal stereoisomer structures, 4 of which contain sn-2 myristic acid, i.e., MMM, MMO, MOM, OMM, MOO, OMO, OOM, OOO. Approximately 40% of the myristic acid resides are found in monomyristin-diolein triglycerides while approximately 40% are found in dimyristin-monoolein triglycerides. The remaining myristate (only about 10% of the interesterified triglyceride molecules) is found in trimyristin triglyceride. The dimyristin-monoolein triglycerides have a convenient beta-prime crystalline melting point of 20-23° C., providing a very useful hard fat for refrigerated table spreads that will easily melt in ones mouth.

Example 4

Same as Example 3 except one part tripalmitin (instead of trimyristin) and one part high oleic sunflower oil are incorporated into an interesterified dietary fat. The palmitin-containing interesterified fat products can be compared with the myristin-containing homologue products of Example 3. Used as dietary fats in a controlled nutritional setting, these two products are used to critically test the hypothesis that sn-2 myristate-containing triglycerides rather than the homologous sn-2 palmitate triglycerides preferentially increase HDL cholesterol and reduce the LDL/HDL cholesterol ratio in human plasma.

As described above, equal amounts of tripalmitin and high oleic sunflower oil are incorporated into an interesterified dietary fat. The resulting fat contains only 4% by weight linoleic acid and approximately 52% palmitic acid, one-third (17%) of which is sn-2 palmitic acid. If the sunflower oil contains approximately 82% by weight oleic acid (as currently available from Cargill Inc., Minneapolis, Minn.), the resulting triglyceride structures with palmitic and oleic acids produced by random chemical interesterification/rearrangement include 8 principal stereoisomer structures, 4 of which contain sn-2 palmitic acid, i.e., PPP, PPO, POP, OPP, POO, OPO, OOP, OOO. Approximately 40% of the palmitic acid resides are found in monopalmitin-diolein triglycerides while IE3: 50% Trimyristin: 50% Sunflower (54% SATS, 41% MONOS, 4% POLYS) Triglycerides: approximately 40% monomyristin, 40% dimyristin, 10% trimyristin IE4: 50% Tripalmitin: 50% Sunflower (54% SATS, 41% MONOS, 4% POLYS) Triglycerides: approximately 40% monopalmitin, 40% dipalmitin, 10% tripalmitin

TABLE 3

| BLENDS | PERCENTAGES BY WEIGHT | | | | | | |
|---|---|---|---|---|---|---|---|
|  | Myr | Sn-2M | Palm | SATS | Oleic | Lino | P/S |
| 1. 100% IE1 | 25 | 8 | 3 | 31 | 62 | 6 | 0.19 |
| 2. 94% IE1 + 6% Saff | 24 | 8 | 3 | 30 | 60 | 10 | 0.33 |
| 3. 87% IE1 + 13% Saff | 22 | 7 | 4 | 28 | 57 | 15 | 0.54 |
| 4. 80% IE1 + 20% Saff | 20 | 7 | 4 | 27 | 53 | 20 | 0.74 |
| 5. 100% IE2 | 39 | 13 | 2 | 44 | 50 | 5 | 0.11 |
| 6. 93% IE2 + 7% Saff | 36 | 12 | 3 | 42 | 47 | 10 | 0.24 |
| 7. 86% IE2 + 14% Saff | 34 | 11 | 3 | 39 | 45 | 15 | 0.38 |
| 8. 79% IE2 + 21% Saff | 31 | 10 | 3 | 37 | 42 | 20 | 0.54 |
| 9. 100% IE3 | 50 | 17 | 2 | 54 | 41 | 4 | 0.07 |
| 10. 92% IE3 + 8% Saff | 46 | 15 | 2 | 51 | 39 | 10 | 0.20 |
| 11. 85% IE3 + 15% Saff | 43 | 14 | 3 | 47.5 | 37 | 15 | 0.32 |
| 12. 78% IE3 + 22% Saff | 39 | 13 | 3 | 44 | 35 | 20 | 0.45 |
| 13. 100% IE4 | — | 17 | 52 | 54 | 41 | 4 | 0.07 |
| 14. 92% IE4 + 8% Saff | — | 15 | 48 | 51 | 39 | 10 | 0.20 |
| 15. 85% IE4 + 15% Saff | — | 14 | 46 | 47.5 | 37 | 15 | 0.32 |
| 16. 78% IE4 + 22% Saff | — | 13 | 42 | 44 | 35 | 20 | 0.45 | approximately 40% are found in dipalmitin-monoolein triglycerides. The remaining palmitin (only about 10% of the interesterified triglyceride molecules) is found in tripalmitin triglyceride. The dipalmitin-monoolein triglycerides have a beta-prime crystalline melting point of 20-23° C.

Example 5

Same as Example 3 except one part trimyristin and one part regular safflower oil (Cargill Inc.) are interesterified. The safflower oil provides a high level of linoleic acid, i.e., 78% by weight, and also 13% oleic acid and 9% saturated fatty acids. The result of random interesterification is much the same as in Example 3 except that the sunflower's oleic acid is replaced by the safflower's linoleic acid (L) to produce principally MMM, MML, MLM, LMM, MLL, LML, LLM, and LLL.

Example 6

A further analysis of the first four exemplary fats described above is provided below, in which these interesterified fats are subsequently blended, i.e., mixed, with natural safflower oil to increase the level of linoleic acid in the dietary fat to achieve final levels of 10%, 15% and 20% by weight linoleic acid.
Dietary Fat Blends with Interesterfied Triglycerides
Ingredients
Trimyristin triglyceride (14:0)
Tripalmitin triglyceride (16:0)
Sunflower oil (hi oleic) [8% SFA (4% 16:0, 4% 18:0), 82% MUFA (18:1), 8% PUFA (18:2)
Safflower oil (regular) [9% SFA (7% 16:0, 2% 18:0), 12% MUFA (18:1), 78% PUFA (18:2)]
Interesterified Fats
IE1: 25% Trimyristin: 75% Sunflower (31% SATS, 63% MONOS, 6% POLYS) Triglycerides: mostly monomyristin
IE2: 39% Trimyristin: 61% Sunflower (44% SATS, 50% MONOS, 5% POLYS) Triglycerides: intermediate mixture of mono- and dimyristin Unless otherwise defined herein, all terms have their ordinary meanings as understood by one of ordinary skill in the field to which the invention pertains. The use of the article "a" or "an" is intended to include one or more.

All patents and other references cited in the specification are indicative of the level of skill of those skilled in the art to which the invention pertains, and are incorporated by reference in their entireties, including any tables and figures, to the same extent as if each reference had been incorporated by reference in its entirety individually.

One skilled in the art would readily appreciate that the present invention is well adapted to obtain the ends and advantages mentioned, as well as those inherent therein. The methods, variances, and compositions described herein as presently representative of preferred embodiments are exemplary and are not intended as limitations on the scope of the invention. Changes therein and other uses will occur to those skilled in the art, which are encompassed within the spirit of the invention, are defined by the scope of the claims.

It will be readily apparent to one skilled in the art that varying substitutions and modifications may be made to the invention disclosed herein without departing from the scope and spirit of the invention. For example, in addition to the natural, synthetic and semisynthetic dietary fats listed herein, others that are not listed may be incorporated into the compositions described herein. Likewise, other sources of myristic acid, sn-2 myristic acid, linoleic acid and other fatty acids and fats not listed herein that increase plasma levels of HDL-C, decrease plasma levels of LDL-C and decrease the ratio of LDL-C/HDL-C, may be incorporated into the compositions described herein, and used in combinations and concentrations not described herein, to produce synthetic and semisynthetic fats that fall within the scope of the present invention. Genetically engineered and naturally selected plant species that produce fats whose triglycerides are structured and whose fatty acid levels are in accordance with the present invention also fall within the scope of the present invention. Thus, such additional embodiments are within the scope of the present invention and the following claims.

The invention illustratively described herein suitably may be practiced in the absence of any element or elements, limitation or limitations which is not specifically disclosed herein. Thus, for example, in each instance herein any of the terms "comprising", "consisting essentially of" and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In addition, where features or aspects of the invention are described in terms of Markush groups or other grouping of alternatives, those skilled in the art will recognize that the invention is also thereby described in terms of any individual member or subgroup of members of the Markush group or other group.

Also, unless indicated to the contrary, where various numerical values or value range endpoints are provided for embodiments, additional embodiments are described by taking any 2 different values as the endpoints of a range or by taking two different range endpoints from specified ranges as the endpoints of an additional range. Such ranges are also within the scope of the described invention. Further, specification of a numerical range including values greater than one includes specific description of each integer value within that range.

Thus, additional embodiments are within the scope of the invention and within the following claims.

What is claimed is:

1. An edible fat composition comprising:
   (a) at least 1% by weight myristic acid esterified at the sn-2 position in triglyceride molecules (sn-2 myristic acid);
   (b) between 10% and 40% by weight linoleic acid;
   (c) between 30% and 65% by weight oleic acid;
   (d) between 15% and 40% by weight saturated fatty acids, wherein the weight ratio of sn-2 myristic acid to sn-2 palmitic acid is at least 1:1, and the sum of weight percentages for components (a)-(d) equals 100%.

2. The edible fat composition of claim 1, wherein said composition is substantially cholesterol-free.

3. The edible fat composition of claim 1 comprising at least 3% by weight myristic acid esterified at the sn-2 position in triglyceride molecules.

4. The edible fat composition of claim 1, wherein said weight ratio of sn-2 myristic acid to sn-2 palmitic acid is at least 2:1.

5. The edible fat composition of claim 1, wherein the weight ratio of sn-2 myristic acid to sn-2 lauric acid is at least 1:1.

6. The edible fat composition of claim 1, wherein at least 50% of said myristic acid esterified at the sn-2 position in triglyceride molecules is produced by interesterification.

7. The edible fat composition of claim 1, comprising between 3% and 20% by weight myristic acid esterified at the sn-2 position in triglyceride molecules.

8. The edible fat composition of claim 1, wherein the ratio by weight of saturated fatty acids to linoleic acid is greater than one.

9. The edible fat composition of claim 8, further comprising alpha-linolenic acid, EPA, DHA, or combinations thereof.

10. The edible fat composition of claim 1, wherein at least 95% of the sn-2 myristic acid is esterified within triglyceride molecules.

11. The edible fat composition of claim 1, wherein at least 90% of the triglyceride molecules having an sn-2 myristic acid carry an unsaturated fatty acid esterified at the sn-1 glyceride position, the sn-3 glyceride position, or both the sn-1 glyceride position and the sn-3 glyceride position.

12. The edible fat composition of claim 1, wherein the triglyceride molecules comprising sn-2 myristic acid further comprise myristic acid esterified at either the sn-1 or sn-3 glyceride position.

13. A prepared food product comprising the edible fat composition of claim 1.

14. An edible fat composition comprising:
   (a) at least 1% by weight myristic acid esterified at the sn-2 position in triglyceride molecules (sn-2 myristic acid);
   (b) between 10% and 40% by weight of linoleic acid and at least one polyunsaturated fatty acids selected from the group consisting of alpha-linolenic acid, EPA, and DHA;
   (c) between 30% and 65% by weight oleic acid;
   (d) between 15% and 40% by weight saturated fatty acids; and
   wherein the weight ratio of sn-2 myristic acid to sn-2 palmitic acid is at least 1:1, and the sum of weight percentages for components (a)-(d) equals 100%.

15. A method of preparing a substantially cholesterol-free, edible fat composition, comprising:
   (a) preparing by interesterification a substantially cholesterol-free edible oil rich in sn-2 myristate; and
   (b) blending the edible oil in (a) with at least one other substantially cholesterol-free edible oil, thereby forming a substantially cholesterol-free, edible fat composition, wherein the edible fat composition comprises:
      (i) at least 1% by weight myristic acid esterified at the sn-2 position in triglyceride molecules (sn-2 myristic acid);
      (ii) between 10% and 40% by weight linoleic acid, or between 10% and 40% by weight of linoleic acid and at least one polyunsaturated fatty acids selected from the group consisting of alpha-linolenic acid, EPA, and DHA;
      (iii) between 30% and 65% by weight oleic acid;
      (iv) between 15% and 40% by weight saturated fatty acids,
   wherein the weight ratio of sn-2 myristic acid to sn-2 palmitic acid is at least 1:1, and the sum of weight percentages for components (i)-(iv) equals 100%.

* * * * *